United States Patent [19]
Wiggins

[11] Patent Number: 5,717,604
[45] Date of Patent: Feb. 10, 1998

[54] NETWORK MONITORING SYSTEM FOR TRACKING, BILLING AND RECOVERING LICENSES

[76] Inventor: Christopher Wiggins, 5207 Claremont, Midland, Mich. 48642

[21] Appl. No.: 450,618

[22] Filed: May 25, 1995

[51] Int. Cl.⁶ .................................................. G06F 7/00
[52] U.S. Cl. .................. 364/514 C; 395/200.11; 395/187.01
[58] Field of Search .................. 364/514 C, 464.01; 380/4, 30, 49; 395/187.01, 200.11, 326, 340, 680, 682, 838

[56] References Cited

U.S. PATENT DOCUMENTS

| | | | |
|---|---|---|---|
| 4,924,378 | 5/1990 | Hershey et al. | 395/187.01 |
| 5,023,907 | 6/1991 | Johnson et al. | 380/4 |
| 5,386,369 | 1/1995 | Christiano | 364/464.01 |

OTHER PUBLICATIONS

Dialog Pocket Guide—Dialog Information Services 1994 (no month) p. 61.

Primary Examiner—James P. Trammell
Assistant Examiner—Thomas Peeso
Attorney, Agent, or Firm—Michael D. Wiggins

[57] ABSTRACT

A network monitoring system operates on a computer including processor for running a multi-tasking operating system capable of having active and inactive windows. The computer is connected to a server or a service which provides access to a user application subject to a license restriction. When the user application is associated with the active window, the user application is executed by the processor. A license recovering system includes a display coupled to the processor for displaying a user interface of the operating system. A user prompting device, run by the processor, the display and associated with an inactive window, prompts a user when the the inactive window has been inactive for a period greater than a first predetermined period. A closing device closes the user application when the inactive window has been inactive for a period greater than a second predetermined period. The network monitoring system also includes a real-time billing system for billing the computer user for access time to the user application subject to the license restriction to alleviate problems occurring in shared license pools on a network. The network monitoring system also includes a user priority system which defines user priorities for the application shared on the network. The priority system closes a current user accessing the user application if the priority of a new user requesting access is greater than the priority of the current user or if the application of the current user is idle.

29 Claims, 5 Drawing Sheets

NETWORK MONITORING SYSTEM FOR TRACKING, BILLING AND RECOVERING LICENSES

BACKGROUND OF THE INVENTION

1. Technical Field

This invention relates to computers, and more particularly, to a network monitoring system for tracking, billing and recovering licenses for computers connected to a network and running multi-tasking operating systems.

2. Background of the Invention

As a result of intense competition and innovation, personal computers (PCs) have become more versatile by evolving from a single-tasking, stand-alone device to a single-tasking network device to a multi-tasking network device. As a stand-alone device, PCs run an operating system, such as DOS®, which is capable of executing only one application at a time ("single-tasking"). Every application that the user intends to run has to be installed on the stand-alone PC. The stand-alone PC runs one application at a time and starts and stops each application in succession. Therefore, stand-alone PCs have a 1:1 ratio of PCs to licenses. For example, if the PC user desires five applications, such as word processing, terminal emulation, a spreadsheet, graphics, and a database, the user requires five licenses, in other words, a license copy for each application installed on the stand-alone PC.

Local area networks (LANs) allow the interconnection of multiple PCs. Each PC shares disk space, files, printers, and other I/O devices with a network server. However, the PCs still run a single-tasking operating system and, therefore, still run only one license application at a time. Using the network server, however, the applications are shared by the multiple PCs ("shared license pool"). Not every PC needs to have each application installed locally at the same time nor is a license copy required for each PC.

Because the PCs are still single-tasking, not every PC needs to access every application all of the time. The applications are available on the network server when they are needed. Therefore, depending on the statistical demand, a single copy of an infrequently used application is shared among many users. Even the most popular application does not require a license for every user. The benefits of the shared use of the applications on the server allow the ratio of PCs to licenses to increase significantly, for some applications a ratio 15:1 (fifteen PCs accessing the server to one license available on the network server) are typical. This shared use of applications resulted in a cost saving because license cost is typically based upon the number of concurrent users.

When multi-tasking operating systems, such as Windows®, were introduced, the prior cost savings of sharing applications on the network server were reduced. A PC running a multi-tasking operating system is capable of running multiple applications at a time. Therefore, a single PC user can tie up multiple licenses. Network PCs running a multi-tasking operating system can still access the shared license pool on the network server. However, theoretically, every PC can access every application at the same time. Therefore, a single user could tie up multiple applications on the server and reduce access to these by other users.

The effect of multi-tasking operating systems on shared license pools caused the industry to move backwards from the higher ratios towards the 1:1 ratio of PCs to licenses which was the case for stand-alone single-tasking PCs. In other words, multi-tasking operating systems increase license requirements and costs in a network having a shared license pool.

Therefore, a network monitoring system which reduces license cost for a network of computers running multi-tasking operating systems is desirable. Further, a network monitoring system which optimizes use of licenses in a shared license pool is desirable.

In a network having a shared license pool, a fixed number of licenses are available at one time. Problems occur when a large number of users tend to desire access to an application at a common or prime time. For example, a shared license pool may have one license for every five machines for a word processing application. A large number of users may desire access to the word processor at the same time, for example at the end of the month to prepare monthly reports. Because only a fixed number of licenses are available, some users will be unable to access the desired application during the prime time. Even a manager who may need access to the wordprocessing application more than some of his employees is denied access if the fixed number of licenses in the shared license pool are being used. The only way to alleviate this problem is to purchase additional license copies which increases costs. Therefore, a network monitoring system which addresses these problems is also desirable.

As the trend of having a large number of users on a network increases, processing power of a service provider providing access to user applications on the network will become more scarce. Typically the service provider providing access to the user application performs the processing and the user operates in a terminal mode. In essence, the user's processor only executes terminal processing related to input and output of already-processed data from the service provider. Competing uses of the service provider such as sharing large common files, sharing meterfiles, and running more complex applications are also competing for processing time/power.

As the number of users increases, the processing demand will likewise increase and the service provider will require more and more processing power. Therefore it is desirable to decrease demands on the service provider's processor to allow the service provider to focus on processing data or user applications which cannot be performed by the user.

SUMMARY OF THE INVENTION

A network monitoring system according to the invention includes a computer with a processor for running a multi-tasking operating system capable of having both active and inactive windows. The computer is connected to at least one of a server and a service which provides said computer access to a user application subject to a license restriction. The user application is associated with one of said active and inactive windows. When said user application is associated with one of said active windows, said user application is executed by said processor. A display, coupled to said processor, displays a user interface of said operating system. A user prompting device, associated with said processor, said display and said user application, prompt a user when said one of said active and inactive windows associated with said user application has been inactive for a period greater than a first predetermined period.

According to another feature of the invention, a closing device, associated with said processor and said user application, closes said user application when said one of said active or inactive windows associated with said user application has been inactive greater than a second predetermined period.

According to still another feature, a check device, associated with said processor, said user prompting device, and said closing device, periodically enables said user prompting device and said closing device based on a third predetermined period shorter than said first and second predetermined periods.

According to still another feature of the invention, an identification (ID) device, associated with said computer, generates an access request including a computer ID to access said user application and a termination request to terminate said user application. An application usage storing device, coupled to said ID device, stores said computer ID and user startup and termination data based on said access and termination requests for said computer. A billing device, associated with said application usage storing device, generates billing for said computer for use of said user application based upon said user startup and termination data.

According to still another feature of the invention, a plurality of computers each include a processor for executing a multi-tasking operating system capable of having active and inactive windows. The plurality of computers are connected to at least one of a server and a service which provides access to said user application. A network monitor, coupled to said plurality of computers, for provides a first predetermined number of users access to said user application. A storing device, associated with said network monitor, for stores a user identity and a user priority for each of said first predetermined number of users. A comparing device, associated with said network monitor and said storing device, compares a user priority of a new user requesting access to said user application to said user priorities stored in said storing device when said first predetermined number of users are currently accessing said user application.

According to still another feature, a closing device, coupled to said comparing device, closes said user application for one of said first predetermined number of users if said user priority of said new user is higher than the user priority of said one of said first predetermined number of users.

According to another feature, a closing device, coupled to said comparing device, for closing said user application for one of said first predetermined number of users if said user priority of said new user is the same as said user priority of said one of said first predetermined number of users and if said user application of said one of said predetermined number of users is associated with an inactive window.

According to another feature, an access granting device, coupled to said comparing device, grants said new user access to said user application.

Other objects, features and advantages will be readily apparent from the specification, drawings and accompanying claims.

BRIEF DESCRIPTION OF THE DRAWINGS

The various advantages of the present invention will become apparent to those skilled in the art after studying the following specification and by reference to the drawings in which.

DETAILED DESCRIPTION OF THE INVENTION

I. Background and Hardware System Description

A. Stand-Alone PC.

Figure 1:
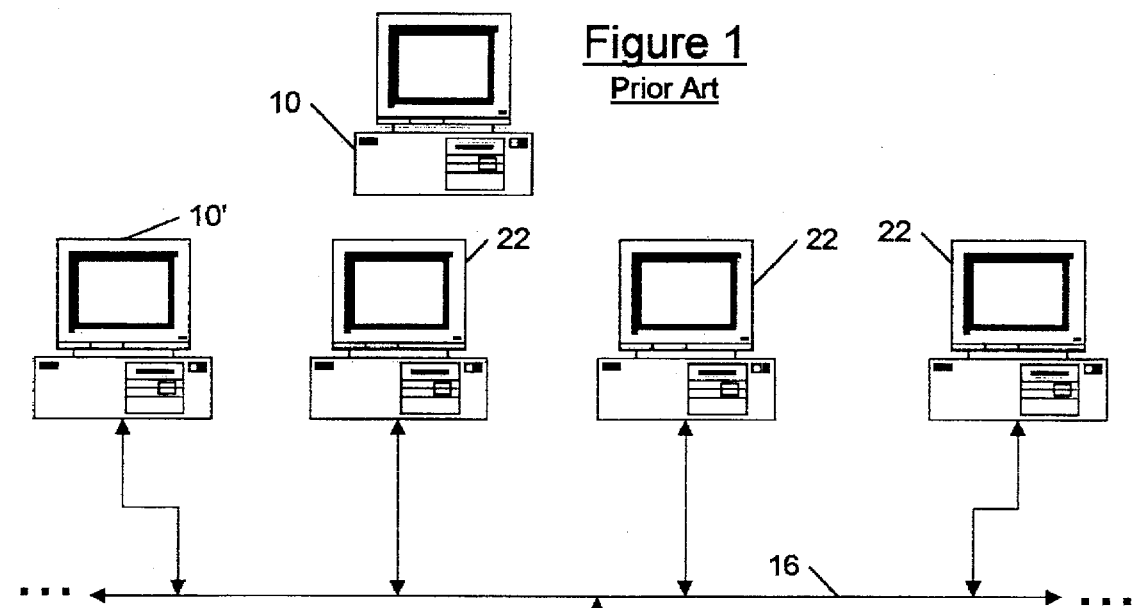
FIG. 1 is a diagram illustrating a stand-alone personal computer (PC) according to the prior art.

In FIG. 1, a PC 10 running a single-tasking operating system according to the prior art is illustrated. PC 10 is a stand-alone computer which is not connected to a network. PC 10 includes a microprocessor, memory, a display, and an input/output (I/O) interface (not shown in FIG. 1). PC 10 runs the single-tasking operating system, such as DOS®, which is capable of executing only one application at a time. Every application which the user desires must be installed in internal or external memory of PC 10. PC 10 runs only one application at a time, each starting and stopping in succession. Therefore, PC 10 requires one license for every application which it runs.

2. PC Running A Single-Tasking Operating System

Figure 2:
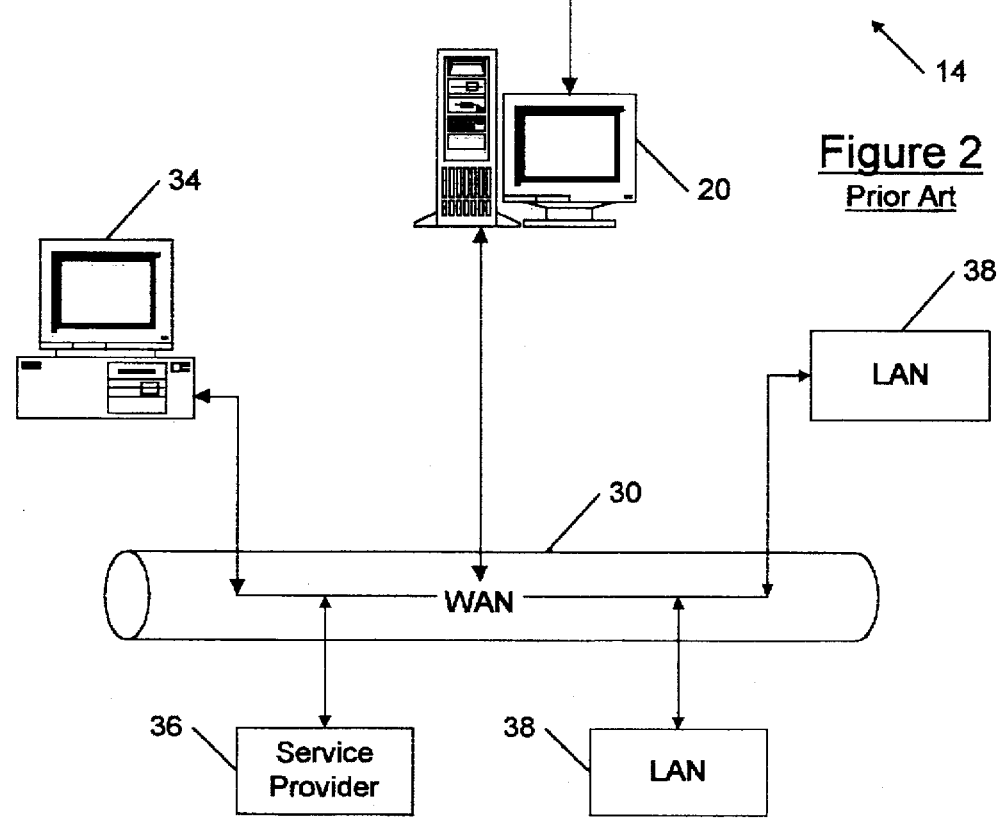
FIG. 2 is an electrical schematic illustrating different interconnections of PCs, servers, and a service provider via local area networks and wide area networks according to the prior art.

With reference to FIG. 2, PC 10' can be connected to a local area network (LAN) 14 via a network bus 16 in a conventional manner. PC 10' can share disk space, files, printers, applications, or other devices, with a network server 20. Because PC 10' runs a single-tasking operating system, such as DOS®, PC 10' can still only run one application at a time. However, PC 10' can be connected to network server 20 and share applications with server 20. PC 10' no longer needs to have every application installed locally as with the stand-alone PC 10 in FIG. 1.

3. PC Running A Multi-Tasking Operating System

Other PCs 22 coupled to LAN 14 in a conventional manner run a multi-tasking operating system, such as Windows®. Each of these PCs 22 is capable of running more than one application at a time, unlike PC 10' which must run only one application at a time. Typically the multi-tasking operating system allows one or more active windows (or application) which is/are currently being executed and multiple inactive windows which are idle. As can be appreciated, PC 22 can more readily exhaust the shared license pool of the server 20 because the user can open multiple licensed application at once. Each PC 20 requires a license copy for each application whether the application is associated with the active or inactive windows.

Server 20 can, in turn, be coupled to a wide area network (WAN) 30, such as the Internet, which can provide additional applications to the PCs 10 and 20. Alternately, a PC 34 running a single- or multi-tasking operating system can be coupled directly to WAN 30 which provides access to a service provider 36 and other LANs 38. Still other configurations will be apparent to skilled artisans.

Figure 3:
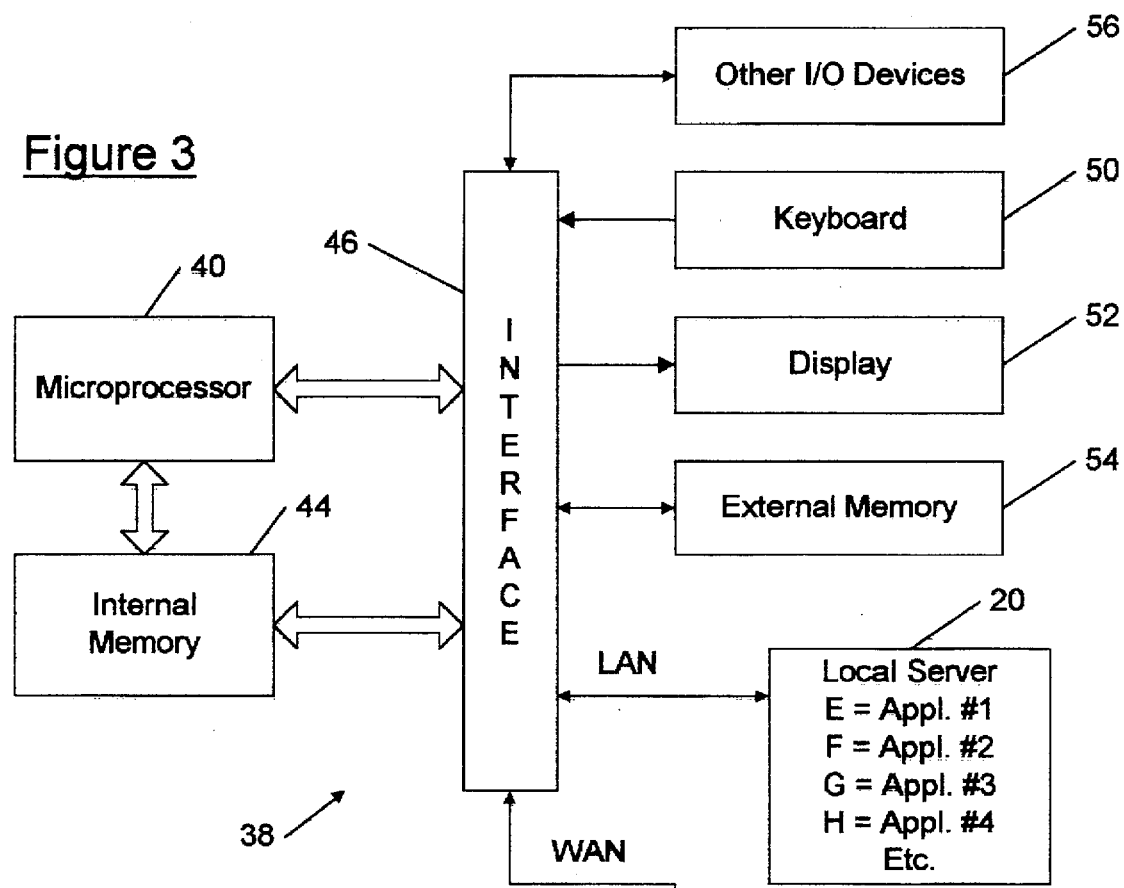
FIG. 3 is an electrical schematic of a personal computer for executing procedures associated with the network monitoring system.

In FIG. 3, PC 22 which runs a multi-tasking operating system is illustrated in further detail. PC 22 includes a microprocessor 40, internal memory 44, and an input/output (I/O) interface 46. PC 22 includes a keyboard 50, a display 52, external memory 54, such as a hard drive, tape drive, CD-ROM, etc. and other input/output (I/O) devices 56 such as a mouse. PC 22 is connectable to a local server 20 via LAN 14 and to a service provider 36 via WAN 30 in a conventional manner.

II. License Recovering Procedure

Figure 4:
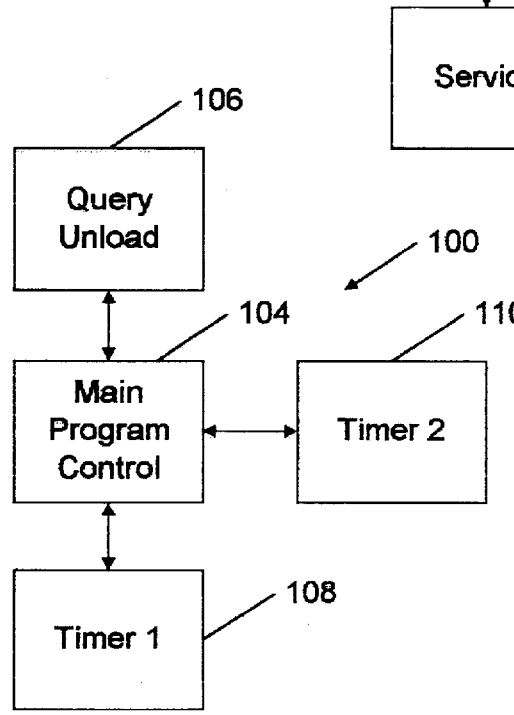
FIG. 4 is a block diagram illustrating a license recovering procedure for the network monitoring system according to the present invention which can be run on the PC, server or service provider of FIG. 3.

In FIG. 4, a functional diagram of a license recovering procedure 100 for the network monitoring system is illustrated. License recovering procedure 100 is preferably implemented as software stored in memory 44 (and/or memory 54) and executed by microprocessor 40 which runs a multi-tasking operating system such as Windows®. As can be appreciated, other multi-tasking operating systems can be employed. Alternately, license monitoring procedure 100 can be implemented in an electronic circuit using discrete components, stored in firmware, etc. License recovering procedure 100 includes a main program control 104, queryunload module 106, Timer1 module 108 and Timer2 module 110.

Queryunload module 106 checks the unload mode of an application. In other words, when the application is being exited, queryunload module 106 checks the propriety of the method of exiting the application. The license recovering procedure 100 allows the user to unload (or quit) if the user employs the built-in procedures of the application and/or if the multi-tasking operating system is being closed. Otherwise, queryunload event 106 displays a message using the user interface to close the running application first. Timer1 module 108 checks the instance of a current active window every chktime seconds. If the current active window is not "our" window (in other words, the application being monitored is inactive), a timer is incremented. If the timer exceeds idletime, an idlemessage is displayed and the timer is reset. If the current window is "our" window (in other words, the application is active), the time is reset. Timer2 module 110 checks the instance of the current active window every chktime seconds. If the current active window is not "our" window, a timer is incremented. If the timer exceeds closintime, license recovering procedure 100 closes the application. If the current window is "our" window, the timer is reset.

As can be appreciated, one or more applications can be monitored. Each application to be monitored would be associated with a running copy of the license recovering procedure 100.

Figure 5:
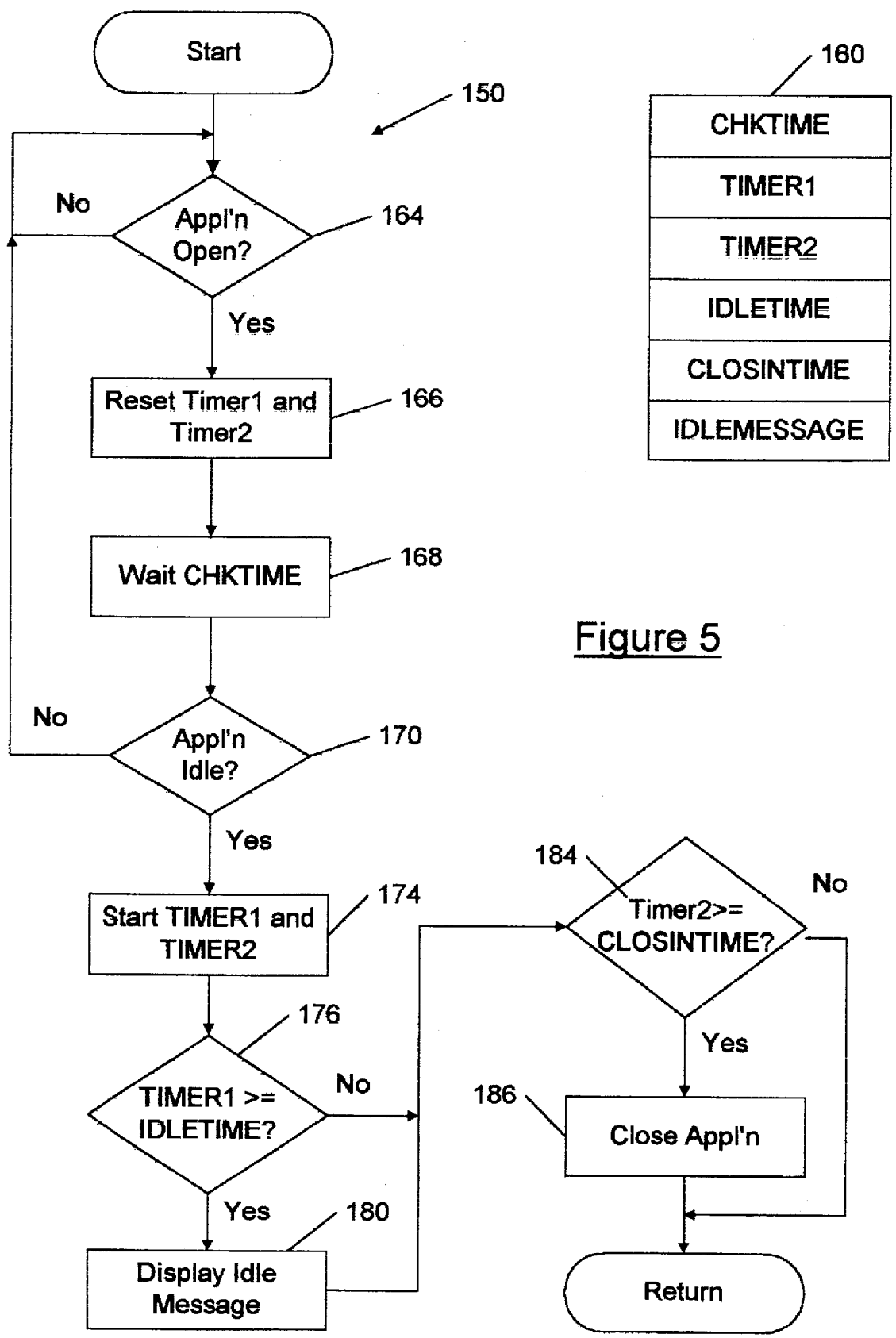
FIG. 5 is a flow chart depicting the license recovering system of FIG. 4 and its associated data structure.

In FIG. 5, a flow diagram illustrates operation of Timer1 and Timer2 modules 106 and 108 of license recovering procedure 100 using a flow diagram 150 and an associated data structure 160. Skilled artisans can appreciate that Timer1 and Timer2 modules 106 and 108 can be event driven instead of flow driven. However, the operation will be analogous. Data structure 160 includes a chktime variable, a Timer1 variable, a Timer2 variable, an idletime variable, a closintime variable, and an idlemessage variable.

License recovering procedure 100 begins at step 164 where control determines whether "our" application is open. If not, control loops until "our" application is open. If "our" is open, control proceeds to step 166 where Timer1 and Timer2 are reset. At step 168, control waits a predetermined period set by chktime variable. At step 170, control determines if "our" application is idle. If not, control returns to step 164. If "our" application is idle, control continues with step 174 where the Timer1 and Timer2 variables are started. Skilled artisans can appreciate that a single timer can be employed if desired.

Control continues with step 176 where the Timer1 variable is compared to the idletime variable. If the Timer1 variable exceeds the idletime variable, control displays an idlemessage such as "Be considerate to others and close this idle application", at step 180. As can be appreciated, the system operator can provide other messages as desired. If the Timer1 variable does not exceed the idletime variable, control proceeds with step 184 where control determines whether the Timer2 variable is greater than or equal to closintime. If the Timer2 variable exceeds the closintime variable, control closes "our" application at step 186. If not, control returns.

The following sections detail a specific implementation of the present invention for PCs operating with Windows®:

I. License Monitoring and Recovering Code Structure

A. Declarations declare Windows ® API functions
      declare Windows ® API Constants
      declare program global variables B. Functions Functions are specifically called in.
      Function IsSucces
         check program return code after trying to connect to
         a network drive and return status
      Function DisSuccess
         check program return code after trying to disconnect
         from a network drive and true status
      Function Drive_in_use
         check the active task list for any program using
         this drive and return true or false C. Events Events can happen at any time
      1. QueryUnload check unload mode
         if attempting to unload from the main program, ok
         if attempting to unload because windows is exiting, ok
         if attempting to unload from anywhere else, display
         message to close the running application first.

2. Timer1 every chktime seconds, get the instance of the current
         active window
         if current active window is not 'our' window
            increment timer interval
            check to see if the elapsed time is grater than
            idletime
               if so, display idlemessage and set the dialog
               to modal if ismodal is true
               reset the timer interval and continue
         if current window is 'our' window, reset the timer
         interval and continue 3. Timer2 every chktime seconds, get the instance of the current
         active window
         if current active window is not 'our' window
            increment timer interval
            check to see if the elapsed time is greater than
            closintime
               if so, send message to the application to close
            reset the timer interval and continue
         if current window is 'our' window, reset the timer
         interval and continue D. Main disable timer events; Timer1 and Timer2
      initialize local variables
      find this program window and hide it from the windows
      task list
      set up the initialization file string based on the program
      path -continued verify that the initialization file is a valid file
process the command line, checking for errors
parse the command line string for the application name and
optional program startup parameters
check for the special command line word "ABOUT"
    if "ABOUT", open the diagnostic dialog box
    wait to close dialog and then end program
open the initialization file
read the service variables;

| | |
|---|---|
| drive | the drive letter to map the serve (share) |
| service | the service (share) to attach to |
| program | the program to run |
| dummy1 | username |
| dummy2 | password |
| ismodal | characteristic of idle message dialog box | build the program string from program and drive
build username and password string from dummy1 and dummy2 if specified
check to see if we are already connected to the service
read the program setup variables;

| | |
|---|---|
| setupgpgm | the setup program to run to install the application |
| appnstlfile | the file to check for to indicate if the application is installed |
| appnstldisk | the disk to install the application on |
| appnstlspace | the required disk space to install this application | check to see if the application is installed by checking for
appnsrlfile
    in not installed
        if so,
            check for the setup program setuppgm and
            set the main program to be the setup program
            verify enough free space on drive appnstldisk
            by checking against size appnstlspace
        if not end the program
if installed, read the miscellaneous variables

| | |
|---|---|
| meterfile | the file used to log the connect, disconnect, terminate and idle times |
| sound1 | the sound played when a drive is connected to the service |
| sound2 | the sound played when an application terminates |
| sound3 | the sound played when the drive is disconnected from the service |
| spawnandend | a parameter to indicate that the application will launch another program and immediately terminate |
| altworkingdir | the path of an alternate working directory for the application |
| idletime | the allowed application idle time |
| chktime | the frequency of the events; Timer1 and Timer2 |
| idlemessage | the message displayed when the application has been idle longer than idletime |
| closintime | the allowed maximum idletime before the application is automatically closed |
| maxusers | the maximum number of users licensed to run the application |
| whofile | the name of the license file that will keep track of who and how many users are using the application |
| alwhodrive | the drive letter of an alternate who file |
| alwhofile | the file name of an alternate license file |
| alwhoservice | the name of the service containing the alternate license file | close the initialization file
read the DOS environment variable NODE
check for the license file whofile
    see if the file whofile exists
        if not, create the file and write the sections;
        application name and maxusers
        if so, check to see if this application name is registered
            if this application name is not registered, register it
            if it is registered, update maxusers
        read the application name section, get maxusers and the number of current users
        see if this NODE is registered -continued if the current users equals maxusers, check for an alternate license file altwhofile
    if an alternate is specified
    connect the alternate license server to altwhoservice
        verify the connection by calling function IsSuccess
        if successful continue
        if not,
            display message indicating no available licenses
            write entry in the meterfile
            end program
read the altwhofile to check if current users is less than maxusers
    if so, continue
    if not
        display message indicating no available licenses
        write entry in the meterfile
        attempt to disconnect the drive
        verify disconnection by calling DisSuccess
        end program
    otherwise update the whofile or altwhofile and continue
if we are not connected, try to connect to the service
    verify the connection by calling function IsSuccess
    if successful continue
    if not
        display message indicating connection failure
        write entry in the meterfile
        end program
if we connect,
    play sound1
    write entry in meterfile indicating NODE, application name, status and time
change default drive and directory to altworkingdir if specified
enable timer events; Timer1 and Timer2
try to run the application
    if not
        generate message
        disconnect drive
        end program
shell the application and keep track of it's instance
wait for the application program to exit
if the program has exited, check for spawnandend
    if spawnandend, get the spawned windows instance and keep track of it
disable timer events; Timer1 and Timer2
play sound2
call function Drive_in_use to see if any other program is using this drive
if the drive is in use by any other program
if no other copies of this application are still running, update the whofile or altwhofile
update the meterfile
end program
if no other application is using the drive, attempt to disconnect it
call function DisSuccess to verify disconnection
play sound3
update the whofile or altwhofile
update the meterfile
end the program II. INI File The software for license recovering procedure 100 checks for an application name on the command line. Command line parameters can be used after the application name. For example:

Command Line: SEAMSTRs Excel C:\mydata.xls

Command Line: SEAMSTRS Word

Where SEAMSTRS™ or SEAMSTRESS™ is the command line name of the network monitoring system. The application name on the command line should match one of the application names in the .INI file. The .INI file specifies the application, services, drive letter, program, install file, set-up program, disk space, username, password, sound files, meter log file, timer interval, idletime, idlemessage and/or message type.

For example, the .INI file can have the following format:

```
A. INI FILE EXAMPLE
    [MSInfo]
    Drive=j:
    service=\\cwsrv1\word60a
    dummy1=testuser
    dummy2=testme
    dummy3=test
    program=\msapps\msinfo\msifo.exe
    Appnstlfile=c:\joesch.moe
    SetupPgm=\winwword\setup.exe
    Appnstlspace=1000
    Sound1=c:\windows\tada.wav
    Sound2=c:\windows\chord.wav
    Sound3=c:\windows\chimes.wav
    MeterFile=zapplictn.mtr
    IsMsgModal=false
    chktime=60
    idletime=1800
    idlemessage="Please be considerate of others."
    SpawnandEnd=YES
    MaxUsers=10
    WhoFile=z:\whofile.who
    AltWhoDrive=0:
    AltWhoService=\\fesrv2\wingrp
    AltWhoFile=\altfile.who
    [Word]
    Drive=j:
    service=\\cwsrv1\word60a
    ... etc ...
    [Excel]
    ... etc ...
    [PowerPoint]
    ... etc ...
```

B. INI File Parameters

1. Appname

The first Keyname is Appname which is preferably a one word name for the application which corresponds to the application name specified on the command line. The Appname will appear as the title on generated message boxes. For example, [MSInfo].

2. Drive

Drive specifies the drive letter to map to the file service (share). This must be a single letter less than or equal to last drive (in CONFIG.SYS) followed by a colon (:). For example, Drive=J.

3. Service

Service specifies the file service (share) name. It should be in \\server\service format. For example, service=\\cwsrv1\word60. The service can be server 20, service provider 36, or any other network with a shared license pool.

4. Dummy

Dummy1 specifies the Username for service connection. This is used for Pathworks™ services where the DOS® use command is;

use j \\server\service%username password Dummy1 is optional.

example; dummy1=testuser Dummy2 specifies the password for service connection. This is used for Pathworks™ services where the DOS use command is;

use j: \\server\service%username password or services where the command is;

use j: \\server\service password Dummy2 is optional.

example; dummy2=testme Dummy3 is truly a dummy variable. It is simply used to throw off nosy users. Dummy3 is optional.

example; dummy3=test In this example the fully qualified connection will look like;

Drive: Service%Username Password or j: \\cwsrv1\word60%testuser testme

5. Program

Program specifies the path of the program to execute. Do not include the drive letter. It will be automatically appended to form the full path. Program is required.

example; program=\msapps\msinfo\msinfo.exe In this example we will connect j: to service \\cwsrv1\word60%testuser testme and run the program j:\msapps\msinfo\msinfo.exe 6. Appnstlfile Appnstlfile specifies the path of a file. This file if it exists, indicated that the program is already installed. So after we connect we will run Program. This file and path normally point to a specific file on the users local disk. If this file is not found, then the program has not been installed. So if not found, we will not run Program. For example, Appnstlfile=c:\joesch.moe.

7. SetupPgm

SetupPgm specifies the path of a setup program. If Appnstlfile file did not exist we will run SetupPgm if it exists. This program is usually SETUP.EXE.

example; SetupPgm=\winword\setup.exe

8. AppNst1Space

AppNst1Space specifies the minimum amount of space, in KB, on drive c: required to install (setup) the program. If AppNst1Space is less than the amount of free space on c:, we will run SetupPgm if it exists. This program is usually SETUP.EXE. AppNst1Space is optional. The default is 1000 KB (1 MB).

example; AppNst1Space=10000

9. Sound1

Sound1, Sound2 and Sound3 are standard .WAV files that can be used for diagnostics. You must have a media player (sound driver) installed on the PC. Sound1 is played when the service (share) is connected. Sound2 is played when the application terminates. Sound3 is played when the service (share) is disconnected.

example; Sound1=c:\windows\tada.wav

Sound2=c:\windows\chord.wav

Sound3=c:\windows\chimes.wav

Sound1, Sound2 and Sound3 are optional. You can use one, two, all or none.

10. Chktime

Chktime is the resolution of the timer clock that checks the application. Every Chktime check to see if the application is idle. To check more often decrease Chktime. To check less often increase Cktime. Chktime is specified in seconds. If specified Chktime must be greater than 10 seconds. For example, Chktime=60 checks if the application is idle every minute.

11. Idletime

Idletime is the number of seconds that the application can be idle. IdletIme is specified in seconds. If specified Idletime must be greater than Chktime.

example; Idletime=1800

Check to see if the application has been idle for 30 minutes. If idle longer than Idletime display Idlemessage. Idlemessage is the text of the message sent to the user when Idletime expires. Chktime, Idletime and Idlemessage all work together and all should be specified or none should be specified. For example, idlemessage="Please be considerate of others."

12. IsMsgModal

IsMsgModal indicates whether the idlemessage box is modal or not. If the message is modal than the user must acknowledge the message box before they can proceed in any application. If the message is not modal, the user does not have to acknowledge it to proceed. The default is modal. To disable set IsMsgModal to false. For example, IsMsgModal=false.

13. MeterFile

MeterFile is the full path of the meter log file. This file path name should include the drive letter as well. This file is normally created (by this program) on the server as a user read, write file. The meter file can be located at service provider 36, PC 22, or anywhere else. If the file is not found it will be created. The file will contain comma separated information as follows;

"Status", "Date&Time", "Node", "message count", "Appname":

Where "Status" is 0 for connection rejected 1 for connected; and 2 for disconnect. "Date&Time" is the current date and time. "Node" is a DOS environment variable identifying the node. For example, SET NODE=CTCW from a DOS batch file. "Message count" is a count of idlemessages sent to the user. "Appname" is the application name from Appname above. For example, "2","2:47:18 PM 2/11/94","ctcw","0","Word"; MeterFile=z:applictn.mtr 14. SpawnandEnd SpawnandEnd identifies a situation in which that the main program begins and spawns a second process to do the work and the main program almost immediately terminates. (This special situation can be detected with the diagnostic sound enabled. When the connected sound occurs, the application runs and the terminate sound occurs, even though the application is still running.) If specified, this flag will pick up on the spawned program and keep track, even though the main program terminated. (The only currently known application is PowerPoint 4.0) The default is not enabled (normal). To enable set SpawnandEnd to yes.

15. WhoFile

WhoFile is the full path of the license compliance file. This file path name should include the drive letter as well. This file is normally created (by this program) on the server as a user read/write file. This file can be created on at service provider 36, PC 22 or anywhere else. If the file is not found it will be created automatically (done the first time.) The file will contain the following information: [Appname]; MaxUsers=number; CurrentUsers=number; Node=status; Node=status; etc. where "Appname" is a copy of the application name; "MaxUsers" is a copy of the MaxUsers number (both Appname and MaxUsers are simply copied out of the .INI file); "CurrentUsers" is the number of active nodes; Nodes is a DOS environment variable identifying the user; "status" is: active if the node is currently running Appname and "idle" if the node is no longer running Appname but once did.

C. Alternate Files

Normally, if the maximum number of users (MaxUsers) are running the application, the next user will be denied connection. By using an alternate file, the program will connect to the alternate file service (share) and check the alternate license file. If there are unused licenses (CurrentUsers<MaxUsers) on the alternate (backup) server, a license copy from the alternate server is used. This allows the creation of a pool of licenses across two servers. For example, server A has 10 copies of a word processor and server B has five copies of a word processor. If the 11th user on server A tries to run Word, the network monitoring system 100 attempts to borrow a license from server B (and/or vice versa) instead of immediately blocking the connection.

1. AltWhoFile

AltWhoFile is the path of the backup (alternate) license compliance file. Do not include the drive letter. This file is normally created (by this program) on the server as a user read/write file. This file will be similar to the main WhoFile only it would have been created any application running from the AltWhoService. For example, AltWhoFile=\altfile.who.

2. AltWhoDrive

AltWhoDrive specifies the drive letter to map to the file service (share) containing the alternate backup license file. This must be a single letter less than or equal to last drive (in CONFIG.SYS) followed by a colon. For example, AltWhoDrive=p:.

3. AltWhoService

AltWhoService specifies the file service (share) name of the alternate or backup license file (whofile). It should be in \\server\service format. This share must have public access. For example, AltWhoService=\\cwsrv2\wingrp In use, a network monitoring system according to the invention allows the PC 22 running a multi-tasking operating system to connect and disconnect to application services provided by server 20 or service provider 36. The network monitoring system monitors application usage and creates a log file of application start, stop, connection rejection and set-up events. The network and monitoring system automates application set-up. The network and monitoring system determines if an application is installed, and if not, can call a set-up program to install the application. The network monitoring system checks for required disk space to install the desired application.

License recovering procedure 100 of the network monitoring system monitors idletime for an application and allows a system operator to set a first predetermined period. If the application is idle longer than the first predetermined period, a idle reminder message is displayed using a user interface of the multi-tasking operating system. The license recovering system also closes idle applications if the idletime exceeds a second predetermined period (closintime). Thus, the idle reminder message makes the user aware that others may need access to an idle application. If the user ignores the idle reminder message, the license recovering procedure closes the idle application to allow use by other network users.

Additionally, the network monitoring system meters the number of concurrent users running an application. If enabled by the system operator, the network monitoring system can check out licenses from a back-up server.

The network monitoring system is an algorithm executed by microprocessor 40 of multi-tasking PC 22. In a highly preferred embodiment, the network monitoring system can be written in Microsoft Visual Basic® using standards Windows® API calls. Input parameters can be set by an operator using a single .INI file to specify application parameters. The network monitoring system is capable of handling programs requiring command line parameters.

The network monitoring system according to the present invention is invisible to the user. The main code is not "visible" from the Windows® task manager. The code can only be terminated by ending the application or ending Windows®. The code uses little heap resource.

A log file is written in coma separated format and is easily imported into any spreadsheet. The diagnostics use standard .WAV files to indicate service connection, application termination and service disconnection. The network monitoring system allows an operator to have security. The network monitoring system allows for username and/or password protection for shared file services. The username/password protection ensures that this is the only way to access the shared applications.

The network monitoring system uses built-in server connection limits which enforces maximum user connections to ensure license compliance. The network monitoring system can also provide license pooling across servers with an alternate license file on a back-up server.

IV. Real Time Billing Procerdure

While real-time billing a PC for access to a service provider when the PC operates in a terminal mode is known, real-time billing of the PC which operating in a client or workstation mode is not.

Figure 6:
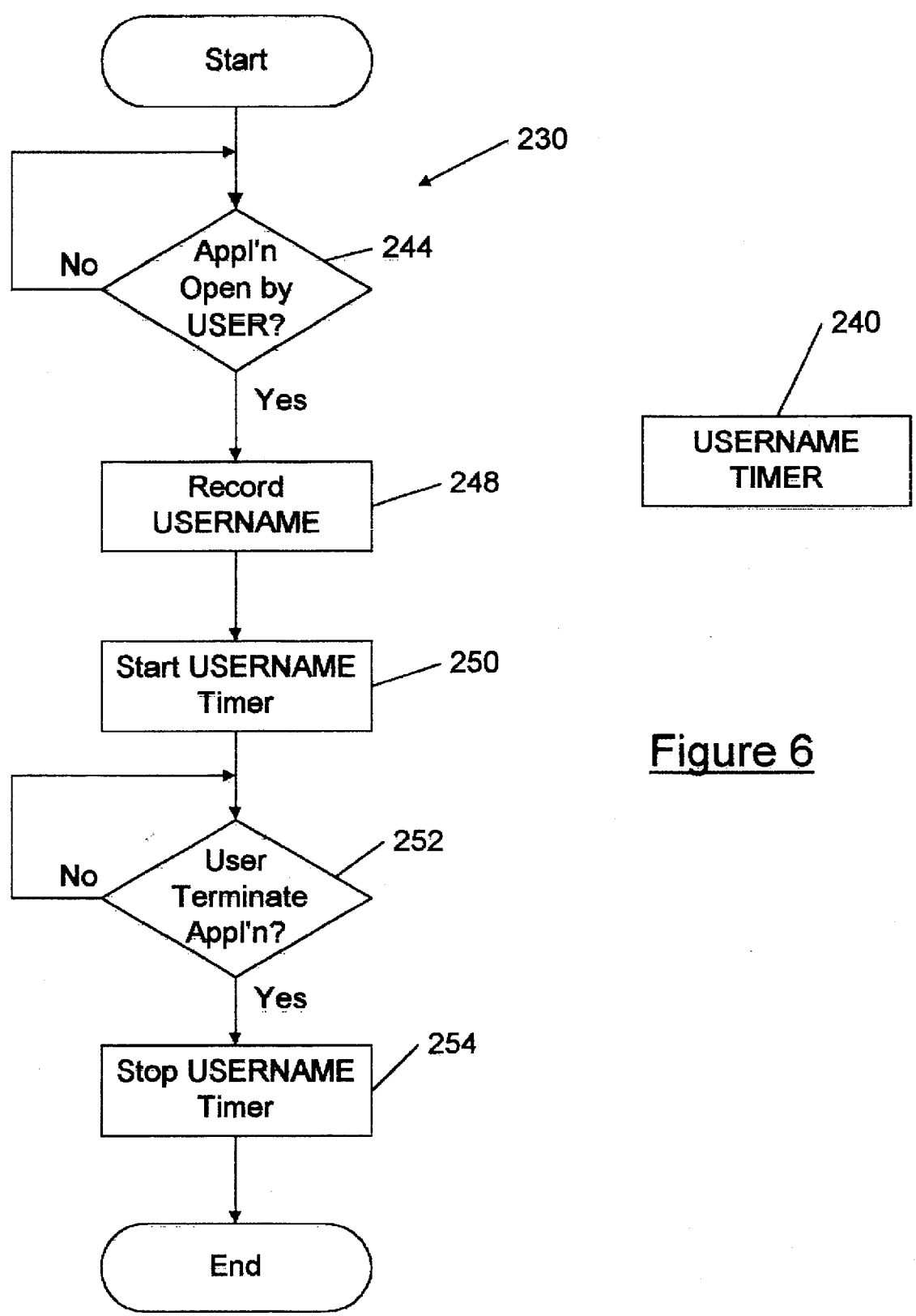
FIG. 6 is a flow chart depicting a real-time license billing procedure for the network and its associated data structure.

In FIG. 6, a real-time billing procedure 230 for the network monitoring system is illustrated along with its associated data structure 240 which includes a username timer variable. Real-time billing procedure 230 begins at step 244 where control determines whether an application is opened by the user. If not, control loops until the application is opened by the user. If the application is opened by the user, the username is recorded at the service, in an encrypted or user inaccessible file on PC 22, on server 20, or any other location in step 248. A username timer is started at step 250.

Control determines whether the user has terminated the application at step 252. If not, control loops until the user does terminate the application. When the user terminates the application at step 252, control stops the username timer at step 254.

In use, a user operating PC 22 opens the application. The network monitoring system of PC 22 generates a connection MeterFile (containing a connection indicator, application name, username, date and time) which is output to an application MeterFile storage located at PC 22, the server 20, the service provider 36, or any other suitable location.

The user is connected to a shared application as described above. However, rather than requiring the user to sign out a license, the real-time billing procedure tracks the amount of time the user accesses the application. In other words, the real-time billing procedure tracks the amount of time the application is associated with active and inactive windows of the multi-tasking system.

When the user terminates the application, the network monitoring system of PC 22 generates a termination MeterFile (containing a termination indicator, application name, username, date and time) which is output to the application MeterFile storage.

Licensing costs can be based on usage. Real-time billing procedure generates user bills based on actual use. Also, users will not be denied access during prime times when other users typically access the application such as when monthly reports are due. Additionally, the network provider will not need to purchase additional license copies. Costs of using the applications can be allocated to the actual users.

Software vendors may also benefit from real-time billing. In the past, if all license copies were checked out, one or more users had to wait until a network license was available. The software vendor could not make any more money unless additional network license copies were sold. The cost of the additional license copies may be prohibitive, particularly where use exceeds the number of license copies infrequently, for example only a few days per month. The real-time billing costs of increased use for the users in excess of the licensed number of users during peak use periods may be significantly less than the cost of additional license copies for each additional user. System providers could also have mixed billing systems which have a fixed number of copies. When additional users access the application, the real-time billing procedure can bill for the additional use.

Network providers may object to such real-time billing systems because users may not have any incentive to use the applications sparingly. Combining the real-time billing system with the license recovering system provides cost protection which alleviates such problems.

V. License Priority Procedure

Figure 7:
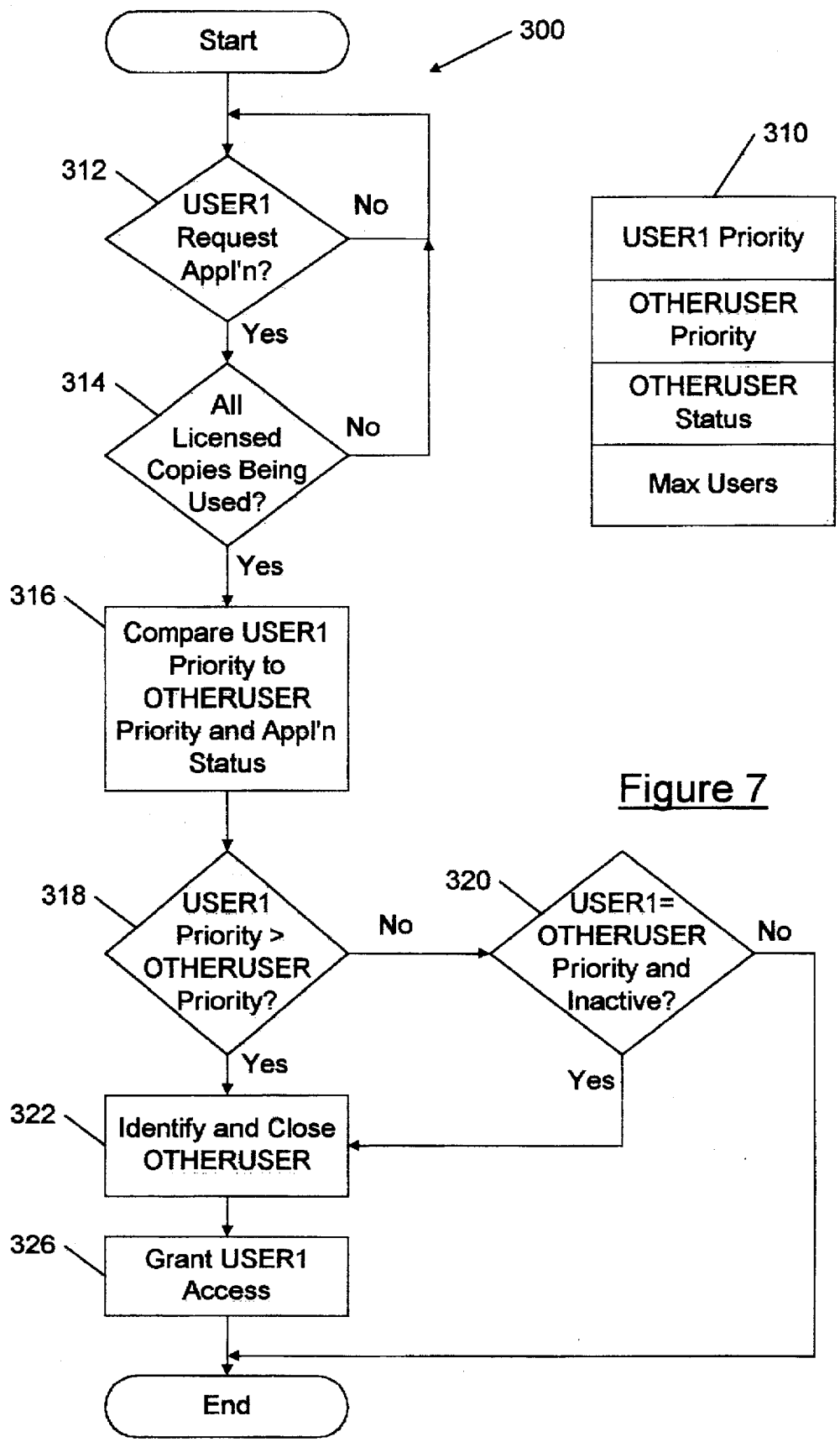
FIG. 7 is a flow chart of a license priority procedure and its associated data structure.

In FIG. 7, a priority license procedure 300 is illustrated along with its associated data structure 310 which includes a user1 priority variable, otheruser priority variable, otheruser status variable and a maxusers variable. Control begins at step 312 where control determines if user1 has requested access to the application. If not, control loops until user1 does request access. If access is requested, control continues with step 314 where control determines if all license copies are being used. The number of license copies is set by the maxusers variable. If not, control returns to step 312. If all license copies are currently being used as determined at step 314, control compares the priority of user1 to otherusers' priority and application status at step 316. If user1 priority is greater than otherusers' priority, or if the user1 priority equals otherusers' priority and the otheruser is inactive as identified at steps 318 and 320, control identifies the other user and closes the application at step 322. Control then grants user1 access to the application at step 326. If neither condition in step 318 and 320 are met, control ends and user1 is denied access.

In use, license priority procedure 300 compares the priority of user1 to the priority of otherusers currently using a licensed copy of the application. Both user1's priority and otherusers priorities are defined by the network operator. If user1's priority is greater than the priority of otherusers, license priority procedure 300 terminates one of the other users having the lowest priority and grants access to user1. If user1's priority is equal to the priority of at least one otheruser and the otherusers' application is inactive, license priority procedure 300 terminates the otheruser and grants access to user1.

As the trend of having large WAN with many users increases, processing power of service providers who provide access to user applications on the WAN will become more scarce. A service provider providing access to the user application performs the processing and the user operates in a terminal mode. In essence, the user's processor only executes procedures related to input and output of already-processed data from the service provider. As the number of users increases, the service provider will require more and more processing power.

As can be appreciated, the network monitoring system of the present invention decreases the demands on the service provider's processor. By having the user execute the user application locally using the user's processor, the connection to the service provider can be decreased or eliminated depending upon the location of the Meterfile, dramatically saving costs of on-line time and processing power of the service provider. As a result, the service provider can allocate the precious processing power to more important tasks, such as sharing large database files, or running more complex applications which are not currently available on personal computers.

The various advantages of the present invention will become apparent to those skilled in the art after a study of the foregoing specification and following claims.

What is claimed is:

1. A network monitoring system comprising:

a computer including processing means for executing a multi-tasking operating system which is capable of running a plurality of user applications each of which being associated with an active or an inactive window, wherein one of said user applications is provided by at least one of a server and a service and is subject to a license restriction, wherein when said one of said user applications is associated with said active window, said user application is executed by said processing means;

display means, coupled to said processing means, for displaying a user interface of said operating system; and user prompting means, run by said processing means and said display means and associated with said one of said user applications, for prompting a user when said one of said user applications has been associated with an inactive window for a period greater than a first predetermined period.

2. The network monitoring system of claim 1 wherein said user prompting means includes a first timer.

3. The network monitoring system of claim 1 wherein said user interface is a graphical user interface.

4. The network monitoring system of claim 1 further comprising:

closing means, run by said processing means and associated with said one of said user applications, for closing said one of said user applications when said one of said user applications has been associated with said inactive window for a period greater than a second predetermined period.

5. The network monitoring system of claim 4 wherein said closing means includes a second timer.

6. The network monitoring system of claim 4 further comprising:

check means, associated with said processing means, said user prompting means, and said closing means, for periodically enabling said user prompting means and said closing means based on a third predetermined period shorter than said first and second predetermined periods.

7. The network monitoring system of claim 1 further comprising:

identification (ID) means, associated with said computer, for generating an access request including a computer ID to access said one of said user applications and a termination request to terminate said one of said user applications;

application usage storing means, coupled to said ID means, for storing said computer ID and user startup and termination data based on said access and termination requests for said computer;

billing means, associated with said application usage storing means, for generating billing for said computer for use of said one of said user applications based upon said user startup and termination data.

8. The network monitoring system of claim 1 further comprising:

a plurality of computers each including a processing means for executing a multi-tasking operating system which is capable of running multiple user applications each of which being associated with an active or an inactive window, wherein said plurality of computers are connected to at least one of a server and a service which provides access to said one of said user applications;

network monitor means, coupled to said plurality of computers, for providing a first predetermined number of users access to said one of said user applications;

storing means, associated with said network monitor means, for storing a user identity and a user priority for each of said first predetermined number of users; and comparing means, associated with said network monitor means and said storing means, for comparing a user priority of a new user requesting access to said one of said user applications to said user priorities stored in said storing means when said first predetermined number of users are currently accessing said one of said user applications.

9. The network monitoring system of claim 8 further comprising:

closing means, coupled to said comparing means, for closing said one of said user applications for one of said first predetermined number of users if said user priority of said new user is higher than the user priority of said one of said first predetermined number of users.

10. The network monitoring system of claim 9 further comprising:

access granting means, coupled to said comparing means, for granting said new user access to said one of said user applications.

11. The network monitoring system of claim 8 further comprising:

closing means, coupled to said comparing means, for closing said one of said user applications for one of said first predetermined number of users if said user priority of said new user is the same as said user priority of said one of said first predetermined number of users and if said one of said user applications of said one of said predetermined number of users is associated with an inactive window.

12. A priority system for granting and denying access to a user application subject to a license restriction comprising:

a plurality of computers each including a processing means for executing a multi-tasking operating system capable of having active and inactive windows, said computer being connected to at least one of a server and a service which provides access to a user application subject to a license restriction, wherein said user application is associated with one of said active and inactive windows, and wherein when said user application is associated with said active window, said user application is executed by said processing means;

network monitor means, coupled to said plurality of computers, for providing a first predetermined number of users access to said user application;

storing means, associated with said network monitor means, for storing a user identity and user priority for each of said first predetermined number of users; and comparing means, associated with said network monitor means and said storing means, for comparing a user priority of a new user requesting access to said user application to said user priorities stored in said storing means when said first predetermined number of users are currently accessing said user application.

13. The priority system of claim 12 further comprising:

closing means, coupled to said comparing means, for closing said user application for one of said first predetermined number of users if said user priority of said new user is higher than said user priority of said one of said first predetermined number of users.

14. The priority system of claim 13 further comprising:

closing means, coupled to said comparing means, for closing said user application for one of said first predetermined number of users if said user priority of said new user is the same as said user priority of said one of said first predetermined number of users and if said user application of said one of said predetermined number of users is associated with an inactive window.

15. The priority system of claim 13 further comprising:

access granting means, coupled to said comparing means, for granting said new user access to said user application.

16. A license monitoring and recovering system comprising:

a computer including processing means for executing a multi-tasking operating system which is capable of running a plurality of user applications each of which being associated with an active or an inactive window, wherein one of said user applications is provided by at least one of a server and a service and is subject to a license restriction, and wherein when said one of said user applications is associated with said active window, said one of said user applications is executed by said processing means;

display means, coupled to said processing means, for displaying a user interface of said operating system; and closing means, run by said processing means and associated with said user application, for closing said one of said user application when said one of said user applications has been associated with an inactive window for a period greater than a first predetermined period.

17. The monitoring device of claim 16 further comprising:

user prompting means, associated with said processing means, said display means and said one of said user applications, for prompting a user when said one of said user applications has been associated with said inactive window for a period greater than a second predetermined period, wherein said first predetermined period exceeds said second predetermined period.

18. A method of monitoring and recovering licenses comprising the steps of:

executing a multi-tasking operating system on a computer which is capable of running a plurality of user applications each of which being associated with an active or an inactive window;

providing one of said user applications using at least one of a server and a service, wherein said one of said user applications is subject to a license restriction;

executing said one of said user applications with a processor associated with said computer when said user application is associated with said active window;

displaying a user interface of said operating system; and prompting a user when said one of user applications has been associated with an inactive window for a period greater than a first predetermined period.

19. The method of claim 18 further comprising the step of:

closing said one of said user applications when said one of said user applications has been associated with said inactive window for a period greater than a second predetermined period.

20. The method of claim 19 further comprising the step of:

periodically enabling said user prompting means and said closing means based on a third predetermined period shorter than said first and second predetermined periods.

21. The method of claim 18 further comprising the step of:

generating an access request including a computer ID to access said one of said user applications and a user termination request to terminate said one of said user applications;

storing said computer ID and user startup and termination time data based on said access and termination requests for said computers;

generating billing for said computer for use of said one of said user applications based upon said startup and termination time.

22. The method of claim 18 further comprising the step of:

providing a first predetermined number of users access to said one of said user applications subject to said license restriction;

storing a user identity and user priority for said first predetermined number of users; and comparing a user priority of a new user requesting access to said one of said user applications to said user priorities stored in said storing means when said first predetermined number of users are currently accessing said one of said user applications.

23. The method of claim 22 further comprising the step of:

closing said one of said user applications for one of said first predetermined number of users if said user priority of said current user is higher than said user priority of said one of said first predetermined number of users.

24. The method of claim 23 further comprising the step of:

granting said new user access to said one of said user applications.

25. In a computer including a processing means for running a multi-tasking operating system capable of having active and inactive windows, said computer being connected to at least one of a server and a service which provides access to a user application subject to a license restriction, wherein said user application is associated with one of said active and inactive windows, and wherein when said user application is associated with said active window, said user application is executed by said processing means, a method of granting and denying access to said user application based upon user priority comprising the steps of:

providing a first predetermined number of users access to said user application subject to said license restriction;

storing a user identity and a user priority for each of said first predetermined number of users; and comparing a user priority of a new user requesting access to said user application to said user priorities stored in said storing means when said first predetermined number of users are currently accessing said user application.

26. The method of claim 25 further comprising the steps of:

closing said user application for one of said first predetermined number of users if said user priority of said new user is higher than said user priority of one of said first predetermined number of users.

27. The method of claim 26 further comprising the steps of:

granting said new user access to said user application.

28. A method of monitoring and recovering licenses comprising the steps of:

executing a multi-tasking operating system on a computer which is capable of running a plurality of user applications each of which being associated with an active or an inactive window;

providing one of said user applications using at least one of a server and a service, wherein said one of said user applications is subject to a license restriction;

executing said one of said user applications with a processor associated with said computer when said user application is associated with said active window;

displaying a user interface of said operating system; and closing said one of said user applications when said one of said user applications has been associated with an inactive window for a period greater than a first predetermined period.

29. The method of claim 28 further comprising the steps of:

prompting a user when said one of said user applications has been associated with said inactive window for a period greater than a second predetermined period shorter than said first predetermined period.

* * * * *